UNITED STATES PATENT OFFICE.

EDWARD A. PARNELL, OF SWANSEA, WALES.

IMPROVEMENT IN TREATING ORES OF ZINC.

Specification forming part of Letters Patent No. 203,849, dated May 21, 1878; application filed March 4, 1878; patented in England, February 28, 1877.

*To all whom it may concern:*

Be it known that I, EDWARD ANDREW PARNELL, of Swansea, in the county of Glamorgan, Wales, have invented new and useful Improvements in Treating Ores of Zinc, which improvements are fully set forth in the following specification.

My said invention consists of a method of preparing or obtaining a material from the treatment of blende or sulphide of zinc, which is well adapted for the manufacture of metallic zinc.

In carrying out my said invention, I first calcine ordinary blende (which has been previously reduced to a state of powder) with exposure to air at a moderate heat, whereby the sulphide of zinc becomes changed partly to sulphate of zinc and partly to oxide of zinc. For this purpose any variety of blende may be used; but my said invention is especially adapted for the poorer or weaker varieties of the ore, which contain so small a proportion of zinc as to be ill adapted for the ordinary mode of obtaining the same by calcination in furnaces and subsequent distillation in earthen retorts. The calcination of such ground blende, as before mentioned, may be effected in the ordinary open calcining-furnace; but I prefer to conduct this operation without direct contact with the gases from the fire, so as to collect the sulphurous acid disengaged during the calcination, and to make the same available for the preparation of sulphuric acid in the usual manner.

A close oven may be used for the operation of calcination; but I prefer to use what is known as "Oxland and Hocking's rotating cylinder," hot air being caused to enter the cylinder at the lower end, instead of employing the gases from a fire-place. I conduct the calcination at a moderate heat, such as is favorable to the production of sulphate of zinc, as will be well understood.

To the calcined ore, which contains both oxide of zinc and sulphate of zinc associated with impurities—that is to say, oxide of iron, oxide and sulphate of lead, and quartz—I next add dilute sulphuric acid, consisting of about three parts of water to one of concentrated acid, in a sufficient quantity to unite with the oxide of zinc in the roasted ore and form neutral sulphate of zinc. The sulphuric acid immediately combines with the oxide of zinc in preference to the oxide of iron, thus affording a solution of sulphate of zinc containing a very small proportion of or no sulphate of iron. The sulphate of zinc thus obtained is separated from the insoluble portion by decantation, filtration, and washing in the usual manner, and then concentrated by evaporation in iron or leaden pans. I next decompose sulphate of zinc obtained in the manner above described, or in any other way, by calcination, so as to obtain therefrom oxide of zinc adapted for the preparation of metallic zinc and sulphurous acid available for the production or recovery of sulphuric acid in leaden chambers and towers, as is well understood. I conduct this calcination in a close furnace or oven, or in retorts similar to coal-gas retorts, so as to avoid direct contact with the gases from the fire-place.

At a high temperature sulphate of zinc is decomposed and resolved into oxide of zinc, and a mixture of sulphurous acid and oxygen gases; but, instead of calcining sulphate of zinc alone, I prefer to mix it previously with a reducing or deoxidizing agent. Various materials of that class may be used, as coal and other carbonaceous matter and sulphur; but that which I prefer as most suitable is sulphide of zinc or raw blende. I mix the blende in a state of fine division with the concentrated solution of sulphate of zinc in such proportion that the zinc in the blende amounts to about one-third of the zinc in the sulphate. After being partially dried this mixture is heated in a close furnace or oven, the sulphurous-acid gas then produced being conveyed by a flue to sulphuric-acid chambers and towers.

The decomposition of the sulphate of zinc in the preceding mixture commences at a temperature below redness; but it is desirable to bring the mixture to a full red-heat before removing it from the furnace. When it ceases to disengage sulphurous acid, it consists, principally, of oxide of zinc associated with a little oxide of iron and silica derived from the portion of blende used in the last operation. It is then fit for use in the manufacture of metallic zinc by distillation with carbonaceous matter in earthen retorts, in the usual way. The proportion of zinc in the calcined product varies from sixty to seventy per cent., according to the strength of the blende mixed with the sulphate for the last operation.

Having thus declared and ascertained the nature of my said invention and in what manner the same is to be performed, I wish it to be distinctly understood that I do not claim the manufacture of sulphuric acid from the gaseous products of the first calcination of raw blende; but What I do consider as being novel and original, and therefore claim, as constituting my said invention, is—

The hereinbefore-described method of disengaging sulphurous acid and manufacturing zinc, which consists in mixing finely-divided sulphide of zinc or raw blende with previously-obtained concentrated sulphate of zinc, decomposing the sulphate of zinc by calcination until the sulphurous acid ceases to be disengaged, and then treating the calcined product to manufacture metallic zinc, substantially as specified.

EDWD. A. PARNELL.

Witnesses:
E. W. WELLINGHAM,
*Solicitor, Swansea.*
REES REES,
*Solicitor's Clerk, Swansea.*